United States Patent [19]
Le Martret et al.

[11] 3,903,114
[45] Sept. 2, 1975

[54] THIOPHENE DERIVATIVES

[75] Inventors: Odile Le Martret, Paris; Francois Clemence, Rosny-sous-Bois, all of France

[73] Assignee: Roussel-UCLAF, Paris, France

[22] Filed: Oct. 1, 1973

[21] Appl. No.: 402,030

[30] Foreign Application Priority Data
Oct. 5, 1972  France .............................. 72.35297

[52] U.S. Cl..... 260/332.2 R; 260/332.3 C; 424/275
[51] Int. Cl.² ........................................ C07D 333/22
[58] Field of Search ............... 260/332.2 R, 332.3 C

[56] References Cited
UNITED STATES PATENTS
3,655,693  4/1972  Shen et al. ..................... 260/332.2

OTHER PUBLICATIONS
Fieser et al., *Advanced Organic Chemistry*, (Reinhold, N.Y., 1961), pp. 441–443.
Morrison et al., Organic Chemistry (Allyn & Bacon, Boston, 1959), pp. 460–461 and 482–483.

*Primary Examiner*—Norma S. Milestone
*Assistant Examiner*—C. M. S. Jaisle
*Attorney, Agent, or Firm*—Hammond & Littell

[57] ABSTRACT

Novel thiophene derivatives of the formula

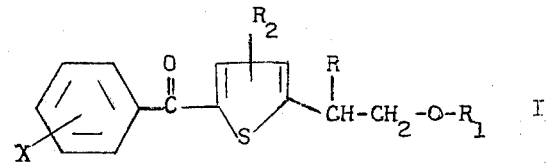

wherein R and $R_2$ are individually selected from the group consisting of hydrogen and methyl with $R_2$ being in the 3- or 4-position of the thienyl ring, $R_1$ is selected from the group consisting of hydrogen and acyl of an organic carboxylic acid of 1 to 18 carbon atoms and X is selected from the group consisting of hydrogen, halogen, methyl, methoxy, $CF_3$— and $CF_3O$— in any position on the benzene ring, the compounds being in racemic or optically active form when R is methyl having anti-inflammatory and analgesic activity.

4 Claims, No Drawings

THIOPHENE DERIVATIVES

STATE OF THE ART

British Pat. No. 1,180,268 describes derivatives of 2-phenyl-thiophene having anti-inflammatory and analgesic activity but they are not structurally related to the benzoylthiophenes of formula I.

OBJECTS OF THE INVENTION

It is an object of the invention to provide the novel 5-benzoyl-thiophenes of formula I and a novel process for their preparation.

It is another object of the invention to provide novel analgesic and anti-inflammatory compositions.

It is a further object of the invention to provide a novel method of relieving pain and inflammation in warm-blooded animals.

These and other objects and advantages of the invention will become obvious from the following detailed description.

THE INVENTION

The novel 5-benzoyl-thiophenes of the invention have the formula

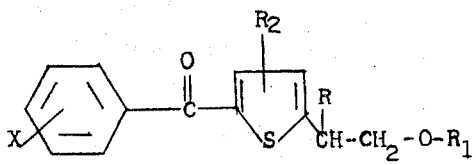

wherein R and $R_2$ are individually selected from the group consisting of hydrogen and methyl with $R_2$ being in the 3- or 4-position of the thienyl ring, $R_1$ is selected from the group consisting of hydrogen and acyl of an organic carboxylic acid of 1 to 18 carbon atoms and X is selected from the group consisting of hydrogen, halogen, methyl, methoxy, $CF_3$— and $CF_3O$— in any position on the benzene ring, the compounds being in racemic or optically active form when R is methyl.

Examples of suitable acids are alkanoic acids such as formic acid, acetic acid, propionic acid, butyric acid, isobutyric acid, valeric acid, isovaleric acid, trimethyl acetic acid, caproic acid, β-trimethylpropionic acid, heptanoic acid, caprylic acid, pelarginic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenylacetic acid and phenylpropionic acid; aryl carboxylic acids such as benzoic acid and 2,4-dinitrobenzoic acid; phenoxy alkanoic acids such as phenoxyacetic acid, p-chlorophenoxy acetic acid, 2,4-dichlorophenoxy acetic acid, 4-tert.-butylphenoxy acetic acid, 3-phenoxy propionic acid and 4-phenoxy butyric acid; heterocyclic carboxylic acids such as furane-2-carboxylic acid, 5-tert.-butylfurane-2-carboxylic acid, 5-bromofurane-2-carboxylic acid and nicotinic acids; β-ketoalkanoic acids such as acetylacetic acid, propionylacetic acid and butyrylacetic acid; amino acids such as diethylaminoacetic acid and aspartic acid.

The acid is preferably a hydrocarbon carboxylic acid of 1 to 10 carbon atoms.

The novel process for the preparation of the 5-benzoyl-thiophenes of formula I comprises reacting a compound of the formula

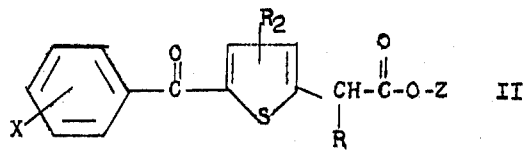

wherein X, R and $R_2$ have the above definition and Z is selected from the group consisting of hydrogen and alkyl of 1 to 5 carbon atoms with a ketalization agent to form a compound of the formula

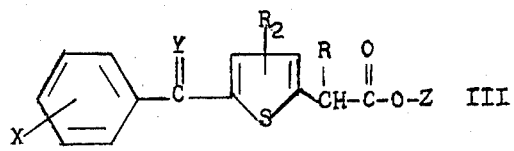

wherein Y is a protected oxo group in the form of a ketal, reacting the latter with a reducing agent to form a compound of the formula

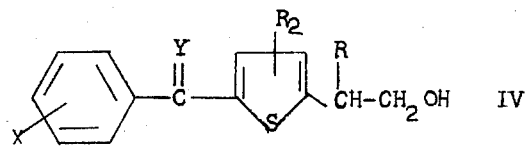

subjecting the latter to hydrolysis to form the compound of formula I wherein $R_1$ is hydrogen and the latter can be reacted with an esterification agent of an organic carboxylic acid of 1 to 18 carbon atoms to form the corresponding carboxylic acid ester of formula I.

The preferred ketalization agent is ethylene glycol and the reaction may be performed in a solvent such as benzene in the presence of a catalyst such as p-toluenesulfonic acid to form the compound of formula III wherein Y is ethylenedioxy. The preferred reducing agent is lithium aluminum hydride. The esterification agent is preferably the acid anhydride or acid chloride of the acid $R_1$—OH wherein $R_1$ has the above definition.

The starting benzoylthiophenes of formula II can be prepared by the process described in Belgium Pat. No. 758,741. When R is methyl, the compounds of formula II may be in racemic form or an optically active isomer and may be resolved when Z is hydrogen with an optically active base. In this case, the compounds of formula I wherein R is methyl, have the same optical configuration as the starting compound of formula II.

The novel analgesic and anti-inflammatory compositions of the invention are comprised of an effective amount of at least one compound of formula I and a pharmaceutical carrier. The compositions may be in the form of injectable solutions or suspensions, tablets, capsules, gelules, drinkable solutions or emulsions, suppositories, creams, pomades or topical powders prepared in the usual manner.

The said compositions of the invention are useful for therapeutic treatment such as treatment of rheumatismatic affections, arthritis, lumbago and zona due to muscular, articular or nervous pain, dental pain and migraines.

The novel method of the invention for relieving pain and/or inflammation in warm-blooded animals comprises administering to warm-blooded animals an analgesically and/or antiinflammatorily effective amount of at least one compound of formula I. The compounds can be administered parenterally, orally, rectally or topically by application to skin or mucous. The usual daily dose is 1 to 20 mg/kg depending the method of administration and the specific compound.

In the following examples there are described several preferred embodiments to illustrate the invention. However, it should be understood that the invention is not intended to be limited to the specific embodiments.

EXAMPLE 1

β-methyl-β-(5-benzoyl-thien-2-yl)-ethanol

STEP A: methyl α-methyl-α-[5-(2'-phenyl-1',3'-dioxa-cyclopent-2'-yl)-thien-2-yl]-acetate 49.6 g of ethylene glycol and 200 mg of p-toluenesulfonic acid were added to a solution of 22.3 g of methyl α-methyl-α-(5-benzoyl-thien-2-yl)-acetate in 200 ml of benzene and the mixture was refluxed for 36 hours and was then cooled. The benzene phase was washed with an aqueous 10% potassium carbonate, then with water and the benzene was evaporated. The residue was purified by distillation to obtain methyl α-methyl-α-[5-(2'-phenyl-1',3'-dioxa-cyclopent-2'-yl)-thien-2-yl]-acetate boiling at 192°-196°C under 0.2 mm Hg.

Analysis: $C_{17}H_{18}O_4S$: % S 10.2 (10.07 — theoretical)

STEP B: β-methyl-β-[5-(2'-phenyl-1',3'-dioxa-cyclopent-2'-yl)-thien-2-yl]-ethanol A solution of 8.5 g of the product of Step A in 25 ml of ether was added progressively with stirring to a suspension of 1 g of lithium aluminum hydride in 25 ml of ethyl ether and the reaction was heated to reflux. At the end of the addition, the mixture was stirred at room temperature for 1 ½ hours and then 1.9 ml of water were added dropwise. The mixture was filtered to remove insolubles and the ether solution was washed with water. The ether was then evaporated to obtain β-methyl-β-[5-(2'-phenyl-1',3'-dioxa-cyclopent-2'-yl)-thien-2-yl]-ethanol as an oil boiling at about 182°-184°C under 0.1 mm Hg. The product was used as is for the next step.

STEP C: β-methyl-β-(5-benzoyl-thien-2-yl)-ethanol

A solution of 7 g of the product of Step B in 210 ml of ethanol and 70 ml of aqueous 1N hydrochloric acid solution was refluxed for a half hour and the mixture was then neutralized with an aqueous 10% potassium carbonate solution. The ethanol was evaporated and the residue was extracted with ether. The ether extracts were washed with water, dried and evaporated to dryness. The residue was purified by chromatography over silica gel using a 6:4 cyclohexane-ethyl acetate mixture as eluant to obtain β-(5-benzoyl-thien-2-yl)-ethanol melting at 67°C.

Analysis: $C_{14}H_{14}O_2S$
Calculated: %C 68.26; %H 5.72; %S 13.04.
Found: %C 68.1; %H 5.6; %S 12.9.

EXAMPLE 2

Acetate of β-methyl-β-(5-benzoyl-thien-2-yl)-ethanol 1.12 g of triethylamine were added to a solution of 2.22 g of β-methyl-β-(5-benzoyl-thien-2-yl)-ethanol in 15 ml of benzene and a solution of 0.78 g of acetyl chloride in 5 ml of benzene was progressively added thereto. The mixture was stirred for 2 hours at room temperature and was filtered to remove the triethylaamine hydrochloride formed. The filtrate was evaporated to remove the solvent and the residue was chromatographed over silica gel. The eluant was a 6:4 cyclohexane-ethyl acetate mixture to obtain 2.32 of the acetate of β-methyl-β-(5-benzoyl-thien-2-yl)-ethanol (Rf = 0.41) as a yellow oil with a refractive index $n_D^{23}$ = 1.5857.

Analysis: $C_{16}H_{16}O_3S$:
Calculated: %C 66.64; %H 5.59; %S 11.12.
Found: % 66.6; %H 5.6; %S 11.3.

I.R. Spectrum (chloroform):
C=O of an ester at $1740^{cm-1}$ and conjugated C=O at $1634^{cm-1}$.

The NMR spectrum was in accord with the indicated structure.

EXAMPLE 3

Tablets were prepared containing 100 mg of the product of Example 1 and 350 mg of a tablet excipient consisting of lactose, amidon, talc and magnesium stearate.

PHARMACOLOGICAL DATA

A. Arthritis test — (preventive treatment)

The injection of Freund type adjuvant into the rear paw provoked in rats the appearance of a primary inflammatory lesion in the paw and after a latency time on the order of 15 days, the release of a secondary arthristis occured in the other rear paw, the front paws, the tail and ears. At zero day of the test, male rats weighing about 150 g received an injection in the rear paw of 0.1 ml of adjuvant (suspension of 6 mg/ml of dead butyric mycobacteria in mineral oil). The animals received the test product orally from day zero to the 17th day. Arthritic control animals received only the adjuvant and normal control animals received no treatment. On the 17th day, the increase in the volume of the rear paws was determined and compared to the normal controls. A dosage of α 2M, glycoprotein which is absent in the normal rat, but which is present in an inflammatory state was effected. Also noted was the presence or absence of arthritic lesions on the ears, tail and front paws. All the data was expressed by the way of a conventional amount and the addition of the amounts obtained constituted the arthritic index. The results were expressed as an average of $DA_{40}$, the dose which permits the 40% lessening of the arthritic index in comparison with the arthritic controls. The $DA_{40}$ for the compound of Example 1 was 10 mg/Kg.

B. Anti-inflammatory test

The test procedure used was that described by Jequier et al. [Arch. Int. Pharmacodyn, Vol. 152 (1954), p.15] and consisted of administering a single injection of 1 mg of naphthoylheparamine into a rear paw of rats weighing about 150 g which provokes the formation of an inflammatory edema. The test compound was administered orally in aqueous suspension one hour before the irritating injection. The volume of the paw was measured immediately before and 2 hours after the irritating injection and the increase in the paw volume is a measure of the degree of inflammation and the $DA_{40}$, lessening of degree of inflammation by 40% as compared to the control, was determined. The $DA_{40}$ for the compound of Example 1 was 5 mg/Kg.

Various modifications of the products and methods of the invention may be made without departing from the spirit or scope thereof and it is to be understood that the invention is to be limited only as defined in the appended claims.

We claim:

1. A compound of the formula

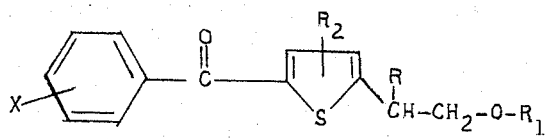

wherein R and $R_2$ are individually selected from the group consisting of hydrogen and methyl with $R_2$ being in the 3- or 4-position of the thienyl ring, $R_1$ is selected from the group consisting of hydrogen and acyl of a hydrocarbon carboxylic acid of 1 to 10 carbon atoms and X is selected from the group consisting of hydrogen, halogen, methyl, $CF_3$— and $CF_3O$— in any position on the benzene ring, the compounds being in racemic or optionally active form where R is methyl.

2. A compound of claim 1 wherein R is methyl and $R_1$ and $R_2$ are hydrogen.

3. A compound of claim 1 which is β-methyl-β-(5-benzoyl-thien-2-yl)-ethanol.

4. A compound of claim 1 which is the acetate of β-methyl-β-(5-benzoyl-thien-2-yl)-ethanol.

* * * * *